C. W. LOWE.
ELECTRIC CABLE.
APPLICATION FILED FEB. 17, 1917.
1,246,964.
Patented Nov. 20, 1917.
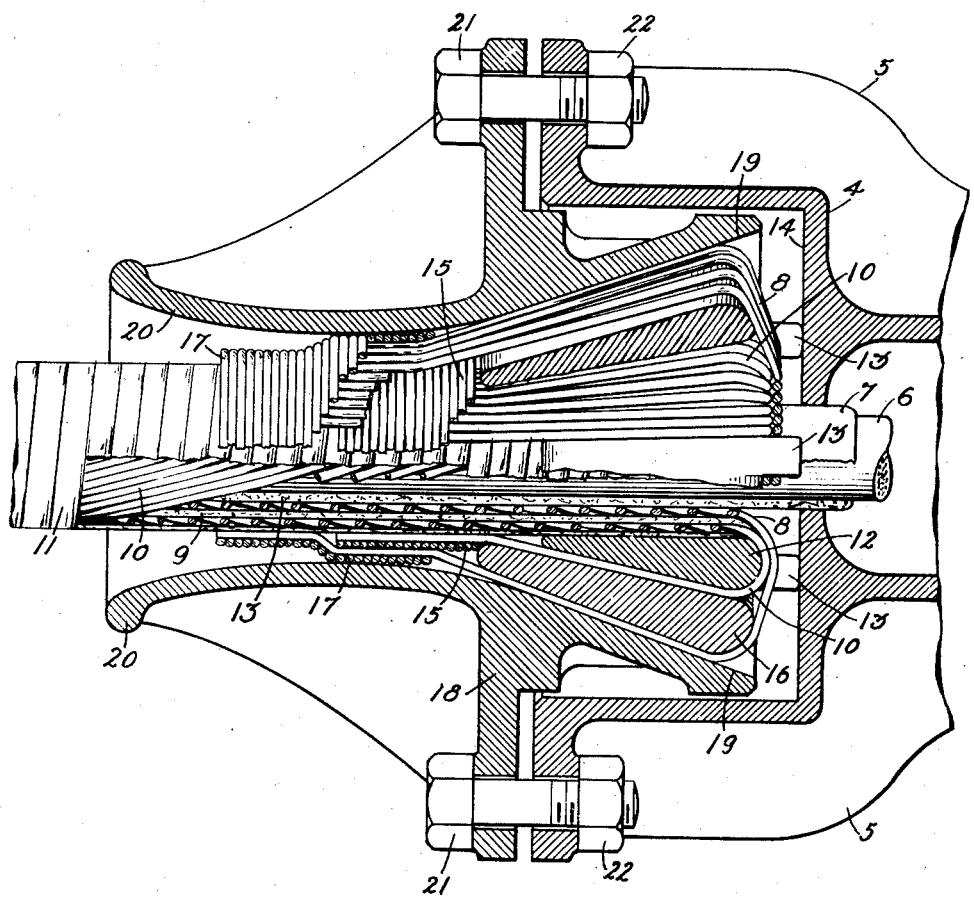
Inventor:
Charles W Lowe
by
Atty

UNITED STATES PATENT OFFICE.

CHARLES W. LOWE, OF JERSEY CITY, NEW JERSEY, ASSIGNOR TO WESTERN ELECTRIC COMPANY, INCORPORATED, OF NEW YORK, N. Y., A CORPORATION OF NEW YORK.

ELECTRIC CABLE.

1,246,964.  Specification of Letters Patent.  Patented Nov. 20, 1917.

Application filed February 17, 1917. Serial No. 149,268.

*To all whom it may concern:*

Be it known that I, CHARLES W. LOWE, a citizen of the United States, residing at Jersey City, in the county of Hudson and State of New Jersey, have invented certain new and useful Improvements in Electric Cables, of which the following is a full, clear, concise, and exact description.

This invention relates to electric cables and connecting cases, and more particularly to moisture-proof cases for inclosing electrical apparatus which is adapted to be connected into submarine cables. The containing cases may be of any desired construction adapted to withstand mechanical stress and to suitably inclose the electrical apparatus.

Such cases have heretofore been used for inclosing loading coils to be connected in telephone circuits in accordance with the well-known Pupin system. Such a case is disclosed in a patent issued to H. C. Egerton, No. 1,073,596, on September 23, 1913. That disclosure relates to submarine cables having a single serving of armor wire.

One of the objects of this invention is to provide a satisfactory means for connecting such a casing to a submarine cable having a plurality of servings of armor wire. Another object is to provide a connecting means for this purpose, which is simple to manufacture, and which can be comparatively easily and quickly assembled.

In accordance with one feature of this invention, a connecting case, such as described in the Egerton patent hereinbefore mentioned, is provided with a plurality of tapered sleeves or conical collars over which the several servings of armor wire may be doubled back, and a clamping member, such as an internally tapered sleeve or thimble, together with means for securing the several members to the connecting casing. Such a connecting casing may be used to protect the joints between wires leading from electrical apparatus and the main cable or to protect the splices between two sections of the main cable.

In accordance with another feature of this invention the casing may be used as a conducting member between two sections of an electrical cable.

Another feature consists in the use of the connecting casing as a tension member between a cable and a stressing means secured to the casing.

This invention will be more clearly understood by reference to the drawing, which shows a section of a connecting casing such as described in the Egerton patent hereinbefore mentioned, a double-armored cable connected thereto, and the devices used for accomplishing such connection. The several members are shown partly in cross-section to more clearly disclose the details of construction.

Referring now to the drawing, 4 is a portion of the casing into which an electric cable 6 extends, 5, 5 being ribs for mechanically strengthening the casing. The cable 6 consists of a plurality of telephone wires properly insulated and covered with a protecting sheath in any well-known manner. The sheath in turn is covered with a serving 7 of jute or other compressible material, over which the inner serving of armored wire 8 is wound. This serving consists of a plurality of strong metallic wires preferably of iron or steel, properly treated to protect them from oxidation. These wires are wound spirally and in parallel over the jute serving 7, in such a way as to completely cover the jute. A second serving of jute 9 is then placed over the inner serving of armored wire 8, after which a second serving of armored wire 10 is added in the same way as the inner serving, except that it may be wound in an opposite direction, which is the preferred method. Surrounding the second serving of armored wire 10 is a final serving of jute 11.

An inner tapered sleeve 12 having four projections 13 and curved portions between these projections, surrounds the armored cable just outside the casing 4, and in such a way that the projections engage an outer surface 14 of the casing. The wires of the outer serving of armor 10, from which the jute serving has been removed, are arranged into four substantially equal groups and bent outward and backward around the curved portions and along the outside surface of the tapered sleeve 12 and then for a short distance along the cable, to which they may be lashed by means of a spirally-wound serving of wire 15. Over the doubled-back portion of the outer serving of armor wires is placed a second tapered sleeve 16, so shaped as to engage the armor wire over its inner surface. The wires of the inner serving of armor 8, from which the serving of jute has also been removed, is likewise divided into four substantially equal groups, which, in turn, are doubled back over the second tapered sleeve 16 for a short distance along the armored cable to which they may be secured by another spiral serving of wire 17. Over the last-mentioned doubled-back portion of armor wire an internally tapered sleeve 18 is placed, the slope of the internally tapered surface 19 being such that it accurately engages the armor wire doubled back over the outer surface of the tapered sleeve 16. This internally tapered sleeve may also have its other end somewhat bell shaped and rounded as shown at 20, whereby the wear on the submarine cable due to its flexure in service is greatly lessened. This internally-tapered sleeve 18 may be secured to the casing 4 by means of a plurality of bolts 21, 21 and coöperating nuts 22, 22, which bolts pass through holes in adjacent flanges on the internally-tapered sleeve 18 and casing 4. By means of these bolts and nuts the internally-tapered sleeve may be forced toward the casing 5 and therefore against the tapered sleeve 12 through the intermediate tapered sleeve 16 and the armor wires to securely clamp the armor wire. The tapered sleeve 12 is prevented from moving toward the surface 14 of the casing 5 by means of the projections 13.

The two tapered sleeves 12 and 16 are necessary in order to secure the proper clamping action for each serving of the armored wire. The movement of the tapered sleeves toward the surface 14 of the casing 5, due to the pressure exerted by the bolts 21, 21 and nuts 22, 22, has the double function of clamping the doubled-back armor wire and taking up any slack in the outward extending section of the doubled-back portions. The conical surfaces of the tapered sleeves also allow for an even distribution of the doubled-back portions of the armor wire thereover. The tapered sleeve 16 is necessary in order to provide a satisfactory bearing surface for the inner serving 8 of the armored wire, and to properly tension it.

The simplicity of assembly is clearly seen from the drawing, and such simplicity is of the greatest importance in apparatus of this kind, where the cable 11 must be connected to the casing 5 on board ship, such as a submarine cable layer, and where speed is often of the utmost importance due to weather conditions.

This method of connecting a plurality of servings of wire to a connecting case is, of course, not limited to loading coil cases and double armored cable such as herein described for purposes of illustration. Other applications will be apparent to those skilled in the art.

What is claimed is:

1. In combination, an electric cable having a plurality of servings of armor, a connecting casing for said cable, a tapered thimble for said casing, a plurality of conical collars within said thimble respectively engaging the several servings of armor, and means for securing said thimble to said casing and for forcing said collars into said thimble.

2. The combination of a casing, a cable entering therein, a plurality of servings of armor wire on the cable, an internally tapered sleeve surrounding the cable, an externally tapered sleeve therein surrounding the armor, another tapered sleeve intermediate said internally tapered sleeve and said externally tapered sleeve, the servings of armor wire severally extending between said sleeves, and means to secure said internally tapered sleeve to the casing to clamp said armor between said sleeves.

3. In combination, an electric cable having a plurality of servings of armor wire, a connecting casing for said cable, a tapered thimble for said casing, a plurality of conical collars within said thimble engaging said several servings of armor respectively, projections on one of said collars contacting with said casing, and means for securing said thimble to said casing and for forcing said collars into said thimble.

4. In combination, an electric cable having a plurality of servings of armor wire, a connecting casing for said cable, a tapered thimble for said casing, a plurality of nested wedge-shaped collars within said thimble, said servings of armor wire extending severally between said collars, and means to secure said thimble to said casing to clamp the several servings of armor wire.

5. The combination of a casing, an electric cable having a plurality of servings of armor wire, a plurality of telescoping tapered sleeves having the several servings of armor wire extending therebetween, and means for securing one of said tapered sleeves to said casing and for forcing said tapered sleeves together to clamp the several servings of armor wire.

6. The combination of a casing, a cable entering therein, a plurality of servings of armor wire over said cable, a tapered sleeve over said armor having projections to engage said casing and rounded portions between said projections to accommodate the outer serving of armor wire when bent back along the cable, a second tapered sleeve over said first-mentioned sleeve and doubled-back armor wire, the inner serving of armor wire being doubled back thereover, an internally tapered sleeve surrounding said before-mentioned tapered sleeves, and means to secure said internally tapered sleeve to said casing for clamping said armor wire.

7. The combination of a connecting member, a cable comprising a plurality of layers of wires, a plurality of tapered sleeves encircling said cable, said layers of wires being severally doubled back over said tapered sleeves, one of said sleeves having projections to engage said connecting member and rounded portions between said projections to accommodate the doubled-back layers of wire, an internally tapered member to engage the doubled-back portion of the inner layer of wires, and means to secure said internally tapered member to said connecting member and to force them toward each other for clamping the several layers of wires.

8. In combination an electric cable having a plurality of servings of armor, a tapered thimble surrounding said cable, a plurality of conical collars nesting into said thimble and respectively engaging the several servings of armor, and means for forcing said collars into said thimble.

9. In combination an electric cable having a plurality of servings of armor wire, a tapered thimble surrounding said armor wire, a plurality of wedge-shaped collars nesting into said thimble, said servings of armor wire extending severally between said collars and said thimble, and means for securing the thimble and collars in said nested relationship.

In witness whereof, I hereunto subscribe my name this 16th day of February, A. D. 1917.

CHARLES W. LOWE.